United States Patent
Tarokh et al.

(10) Patent No.: US 9,509,443 B1
(45) Date of Patent: Nov. 29, 2016

(54) TRANSMISSION SCHEMES FOR DEVICE COMMUNICATIONS

(71) Applicant: Huawei Technologies Co., Ltd., Guangdong (CN)

(72) Inventors: Vahid Tarokh, Cambridge, MA (US); Peiying Zhu, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/729,970

(22) Filed: Jun. 3, 2015

(51) Int. Cl.
*H04L 1/00* (2006.01)
*H04L 25/02* (2006.01)

(52) U.S. Cl.
CPC ......... *H04L 1/0054* (2013.01); *H04L 25/0242* (2013.01)

(58) Field of Classification Search
CPC .................. H04L 1/0054; H04L 25/0242
See application file for complete search history.

(56) References Cited

U.S. PATENT DOCUMENTS

| | | | | |
|---|---|---|---|---|
| 7,092,436 B2* | 8/2006 | Ma | ...................... | H04L 25/0204 375/229 |
| 8,199,861 B1* | 6/2012 | Karkhanechi | ................. | 375/340 |
| 8,325,588 B2* | 12/2012 | Kim | ................... | H04B 1/71075 370/203 |
| 2002/0143754 A1* | 10/2002 | Paulley | ............. | G06F 17/30448 |
| 2003/0189992 A1* | 10/2003 | Nefedov | ............. | H04L 25/0236 375/340 |
| 2004/0208254 A1* | 10/2004 | Lee | ........................ | H04L 1/0618 375/260 |
| 2004/0259514 A1* | 12/2004 | Nissila | ................... | H04L 1/0026 455/226.1 |
| 2005/0276356 A1 | 12/2005 | Hui | | |
| 2006/0062283 A1* | 3/2006 | Zhang | ...................... | H04L 1/005 375/147 |
| 2011/0158302 A1* | 6/2011 | Kim | ....................... | H04L 1/0048 375/224 |
| 2015/0131580 A1* | 5/2015 | Liu | ....................... | H04B 7/0452 370/329 |

OTHER PUBLICATIONS

Li et al. "Joint Sequential Channel Estimation and Multiuser Detection for Uplink CDMA over Multipath Fading", 2002, IEEE, pp. 1882-1886.*
Fu et al., "Two Novel Iterative Joint Frequency-Offset and Channel Estimation Methods for OFDMA Uplink", Mar. 2008, IEEE, pp. 474-484.*
Kocian et al., "EM-Based Joint Data Detection and Channel Estimation of DS-CDMA Signals", Oct. 2003, IEEE, pp. 1709-1720.*
Aldana et al. "Channel Estimation for Multicarrier Multiple Input Single Output Systems Using the EM Algorithm", Dec. 2003, IEEE, pp. 3280-3292.*
Babadi, B. et al., "Sparls: The Sparse RLS Algorithm", IEEE Trans. Signal Process., vol. 58, No. 8, Aug. 2010, pp. 4013-4025.

* cited by examiner

*Primary Examiner* — Sophia Vlahos
(74) *Attorney, Agent, or Firm* — Slater Matsil, LLP

(57) ABSTRACT

A base station communicates with a plurality of user equipments (UEs) using a method. The method includes receiving, by the base station, a plurality of signals from a plurality of user equipments (UE) in communication with the base station. The method also includes using an iterative algorithm to estimate a matrix $\Lambda$ of channel coefficients based on the received signals. The method further includes decoding, at the base station, the received signals using the estimated matrix $\Lambda$.

18 Claims, 4 Drawing Sheets

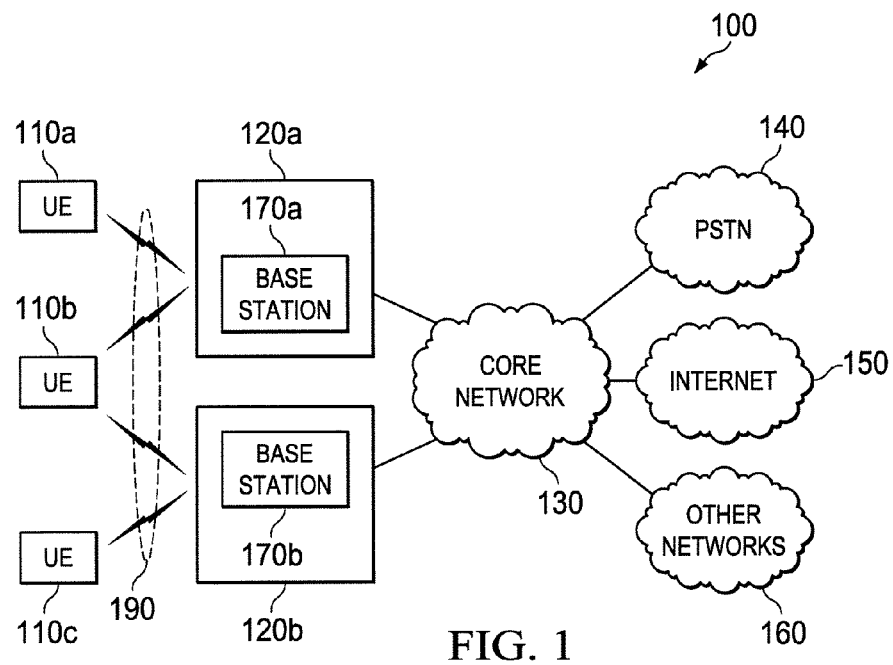
FIG. 1
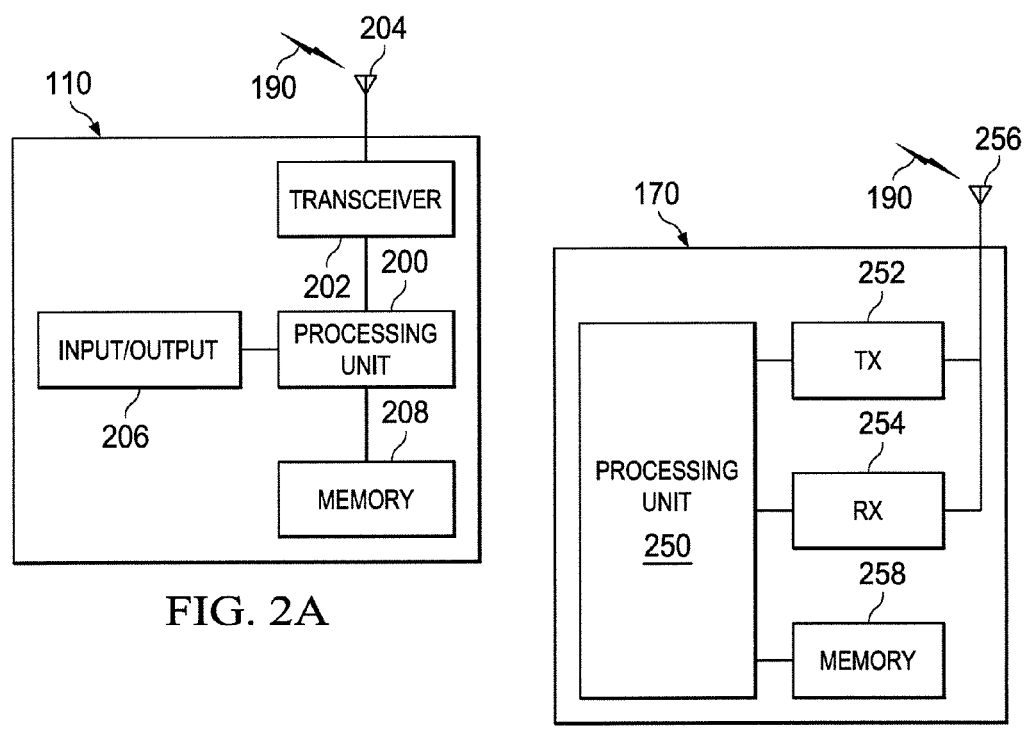
FIG. 2A
FIG. 2B

TRANSMISSION SCHEMES FOR DEVICE COMMUNICATIONS

TECHNICAL FIELD

The present disclosure is generally directed to wireless network communications, and more particularly to transmission schemes, such as for use in future networks including 5G networks.

BACKGROUND

Recently, H. Nikpour and H. Baligh proposed Sparse Code Multiple Access for beyond 4G communications. The gist of this approach is to use sparse codebooks for communications to, and communications by, various users, and use the sparsity to recover the transmitted sequences from superposed codebooks.

In the future, there will be millions of devices that need to be connected. These devices will transmit with very low duty cycles and often will not transmit any information. Thus, at any time slot within a cell/sector, only a few of these devices will be active. Consider a system where a channel (e.g., a subcarrier or resource block) is dedicated to transmission by these devices to the base station.

A practical method for these devices to transmit efficiently to the base station and provide decoding without coordination is desired.

SUMMARY

This disclosure is directed to a new transmission scheme for device communications in a network.

In one example embodiment, a method for use in a wireless communication network is provided. The method includes receiving, by the base station, a plurality of signals from a plurality of user equipments (UE) in communication with the base station. The method also includes using an iterative algorithm to estimate a matrix Λ of channel coefficients based on the received signals. The method further includes decoding, at the base station, the received signals using the estimated matrix Λ.

In another example embodiment, a base station configured to operate in a wireless network is provided. The base station includes at least one memory and at least one processing unit. The at least one processing unit is configured to receive a plurality of signals from a plurality of user equipments (UEs) in communication with the base station; use an iterative algorithm to estimate a matrix Λ of channel coefficients based on the received signals; and decode the received signals using the estimated matrix Λ.

In another example embodiment, a wireless network system is provided that includes a plurality of user equipments (UEs) and a base station configured to communicate with the plurality of UEs. The base station is configured to receive a plurality of signals from a plurality of user equipments (UEs) in communication with the base station; use an iterative algorithm to estimate a matrix Λ of channel coefficients based on the received signals; and decode the received signals using the estimated matrix.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 illustrates a wireless communications system that may be used for implementing the devices and methods disclosed herein;

FIGS. 2A and 2B illustrate example devices including UEs that may implement the methods and teachings according to this disclosure;

DETAILED DESCRIPTION

Figure 3:
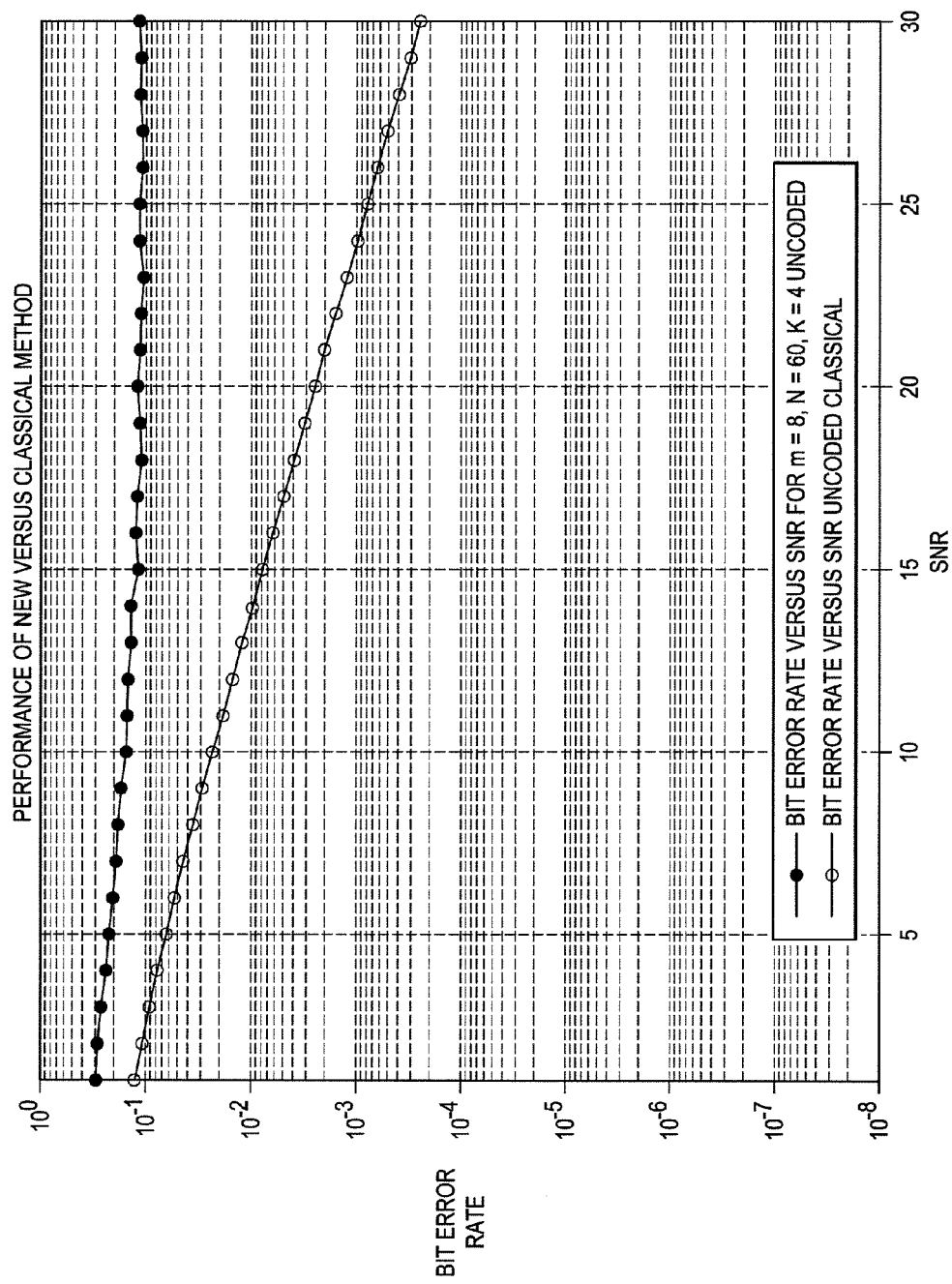
FIG. 3 illustrates a comparison of the bit error rate for this disclosure compared to a classical method.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals or wired signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology. In some embodiments, the UEs 110a-110c may transmit signals to one or more of the base stations 170a-170b without coordination between the UEs 110a-110c.

It is contemplated that the system 100 may use multiple channel access functionality, including such schemes as described herein. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration, and can further include the EPC illustrated in any of the figures herein.

FIGS. 2A and 2B illustrate example devices that may implement the methods and teachings according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Embodiments of this disclosure provide a transmission scheme for device communications in an advanced wireless network.

Consider N low duty UEs 110 in a sector. Let the transmission channel from the i-th UE 110 to the base station 170 be $\alpha_i$. The channels are assumed to be static during each transmission. This is a reasonable assumption as most of the UEs 110 are fixed or quasi-static. Suppose k of the UEs 110 (e.g., users $i_1, i_2, \ldots, i_k$) are active at some time and are transmitting on the dedicated channel (resource block), where k<=N. It is not known which k users are transmitting but it is known that there are at most K of these active UEs 110 where K<<N.

One way to separate these UEs 110 is to allocate a (spreading) sequence:

$$p_i = \begin{pmatrix} p_{1,i} \\ p_{2,i} \\ \vdots \\ p_{m,i} \end{pmatrix}$$

to user i. To transmit the symbol $s_i$, UE i can then send $s_i p_i$. The received signal at the base station 170 is then given by:

$$r = \sum_{j=1}^{k} \alpha_{i_j} s_{i_j} p_{i_j} + n$$

where n is independent and identically distributed (i.i.d.) Gaussian noise.

One way to detect these UEs 110 is to choose m=N and select orthogonal signature sequences $P_i$, i=1, 2, . . . , N for all of the UEs 110. Then, by correlating r with these signature sequences, noisy estimates of $\alpha_{i_j} s_{i_j}$ can be obtained. However, this may not be bandwidth efficient as N can be quite large.

An alternative approach is to choose m<<N. In this way, the underlying signature sequences are not orthogonal. The fact that K<<N can be used to resolve these UEs 110. This can be performed as in multiuser detection. However if K<<N, then the correlation of signature sequences may not be small. A matched filter to determine the active UEs 110 may not have good performance due to the interference by other UEs 110 and near-far problems. Multiuser detection of all UEs 110 may also be computationally complex.

Thus, an alternative approach is desired. To model the problem, it is assumed that all UE 110 transmissions are codewords of length M. If a codeword ($c_{1,i}$, $c_{2,i}$, . . . , $c_{M,i}$) is to be transmitted, UE i transmits ($c_{1,i} p_i$, $c_{2,i} p_i$, . . . , $c_{m,i} p_i$). Any inactive UE can be thought as transmitting an all zero codeword.

Let $\Lambda$ be an N×M matrix of channel coefficients whose j-th row $\Lambda[j,\cdot]$ is ($c_{1,j}\alpha_j, c_{2,j}\alpha_j, \ldots, c_{M,j}\alpha_j$), where ($c_{1,j}$, $c_{2,j}$, . . . , $c_{M,j}$) is the codeword transmitted by $UE_j$. Then, the matrix R, which represents the received signals, can be determined according to the following:

$$R = P\Lambda + n \qquad (1)$$

where $P=[p_{i,j}]$ is an m×N matrix whose i,j-th element is given by $p_{i,j}$, and n is an m×M matrix modeled as an i.i.d. complex Gaussian noise distributed according to $N(0, \sigma^2 I)$, where I denotes the identity matrix.

The vector n captures interference and noise at the base station receiver j during the transmission of coded signature sequences. In the above, the values in the j-th column of R represent the received signals at the base station 170 at times m*(j−1)+1, m*(j−1)+2, . . . m*j for j=1, 2, . . . , M.

What is known is that most of the rows of $\Lambda$ are zeros as most UEs 110 are not active at each time. Thus, it is desired to determine the transmitting UEs 110 and compute their transmitted codewords using this information but with m<<N.

The above scenario is similar to compressed sensing. However, there are some differences between compressed sensing and this scenario. First, $\Lambda$ is a matrix and not a vector. Second, in compressed sensing, a sparse vector must be recovered. However, in this scenario, the matrix $\Lambda$ is row-sparse, i.e., many rows of the matrix $\Lambda$ are zeros. Thus, this disclosure provides new algorithms for reconstructing $\Lambda$.

For any vector $v=(v_1, v_2, \ldots v_M)$, let $$\|v\|^2 = \sum_{j=1}^{M} |v_i|^2$$

be the Euclidean norm and $$\|v\|_1 = \sum_{j=1}^{M} |v_i|$$

be respectively the $L_1$ norm of v. $\|v\|$ is referred to as the length of v. $\|v\|_0$ is defined as the $L_0$ norm of v, which is the number of nonzero elements of v.

It is known that the $L_1$ norm of the vector is a sparsifying regularizer. A regularizer is needed that is sparsifying for the rows of matrix $\Lambda$. One such sparsifier is given by $$\|\Lambda\|_1 = \sum_{i=1}^{N} \|\Lambda[i, \bullet]\|_1 = \sum_{i,j} |\Lambda[i,j]|$$

An important observation can be made about this regularizer. Since this regularizer is based on the $L_1$ norm, it sparsifies the elements of the above matrix. This forces the elements of $\Lambda$ to go to zero. However, it is desired that some of the rows (vectors) of $\Lambda$ go to zero. Thus, the $L_0$ norms of the rows of $\Lambda$ are brought into consideration.

The regularized decoder minimizes the objective function $$C(\Lambda) = \frac{1}{\sigma^2} \|R - P\Lambda\|_2^2 + \lambda \sum_{i,j} |\Lambda[i,j]|$$

subject to modifications that forces some of the rows (vectors) of $\Lambda$ to go to zero.

In the above scenario, metric $\lambda>0$ is a regularization parameter that can be fine-tuned. The minimization of $C(\Lambda)$ is not generally easy. The metric $C(\Lambda)$ can be written as the negative of a log-likelihood metric given by a product of independent Gaussians and Poisson-like distributions (plus some constant terms that are dropped from the maximization) parameterized by $\Lambda$, as shown in the following log-likelihood:

$$\log\left(\exp\left(\frac{-\|R-P\Lambda\|_2^2}{\sigma^2}\right) \prod_{i,j} \exp(-\lambda|\Lambda[i,j]|)\right)$$

This means that to minimize $C(\Lambda)$, it suffices to find the parameter $\Lambda$ that maximizes the above log-likelihood (with some constants eliminated from the equation). A standard approach to maximizing the log-likelihood function is the expectation-maximization (EM) algorithm, where a hidden auxiliary variable is revealed.

Let $s_1$ be the maximal eigenvalue of PP*. Let $n_1$ and $n_2$ be independent Gaussian N×M and m×M matrices whose columns are distributed i.i.d. according to $N(0,I)$ and $N(0,\sigma^2 I - \beta^2 PP^*)$, where $\beta > 0$ is chosen such that $$\frac{\beta^2}{\sigma^2} < \frac{1}{s_1}$$

and $P^*$ denotes the Hermitian of P. In fact, after P is designed, $s_1$ can be computed as the maximum eigenvalue of $PP^*$ and set to $$\frac{\beta^2}{\sigma^2} \leq \frac{1}{2s_1}.$$

Also, in this implementation, no knowledge of $\sigma$ is needed, and only the value of $$\frac{\beta^2}{\sigma^2}$$

is needed, which is set as just described.

The hidden auxiliary random variable is revealed in the following:

$$v = \Lambda + \beta n_1.$$

Then, it is easy to see that statistically speaking $$R = Pv + n_2.$$

The expectation (E) and maximization (M) steps of the EM algorithm can now be computed. However, embodiments of this disclosure add a row sparsification step that is not present in a conventional EM algorithm. The iterative algorithm for computing $\Lambda$ is given below.

Estimation Algorithm for $\Lambda$

The estimation algorithm for $\Lambda$ starts by determining an initial estimate $\Lambda^1$ for the channel coefficients $\Lambda$ (step 1). Next, a number of iterations Niter is selected (step 2). For each value $l = 1, 2, \ldots,$ Niter, the following steps 3 through 5 are performed. For the E-Step (step 3), the following is computed:

$$R_l = \left(I - \frac{\beta^2}{\sigma^2} P^* P\right) \Lambda^l + \frac{\beta^2}{\sigma^2} P * R$$

For the M-Step (step 4), the following is computed:

$$\Lambda^{l+1} = \mathrm{sgn}(R_l)\left(|R_l| - \lambda\sigma^2 \frac{\beta^2}{\sigma^2} \mathrm{ones}(m, M)\right)_+$$

where $$\mathrm{sgn}(x) = \frac{x}{|x|} \text{ for } x \neq 0$$

and $\frac{1}{2}$ for $x=0$, ones (m, M) is an m×M matrix whose i,j-th element is one, and $x_+ = x$ for $x \geq 0$ and is zero otherwise.

In step 5, the row sparsification step is performed as follows: If any row of $\Lambda^{l+1}$ has more than L zeros (where L is an integer predefined and optimized by the designer), then replace that row with the all-zero vector.

In the above, the value of $$\frac{\beta^2}{\sigma^2}$$

and $\lambda\sigma^2$ can be fine-tuned. Additionally, depending on the initial guess of $\Lambda^1$, faster or slower convergence of the optimum value of $\Lambda$ can be achieved. A possible initial guess is given next assuming that columns of P (UE signatures) are normalized to all have length 1. Each column $R[\cdot,j]$ is projected on the subspace W spanned by columns of P for $j=1, 2, \ldots, M$. Or stated in mathematical notation, the $\mathrm{Proj}_W(R[\cdot,j])$ is computed. The value of the initial guess is then computed for $\Lambda[\cdot,j]$ as $P^*\mathrm{Proj}_W(R[\cdot,j])$ for $j=1, 2, \ldots, M$. This produces an initial, rough estimate of $\Lambda$. Other initial guesses are also possible.

Estimation Algorithm for the Transmitted Codewords

Once the estimate $\tilde{\Lambda}$ of $\Lambda$ are computed in the above, then the j-th row of $\tilde{\Lambda}$ is an estimate of the j-th row of $\Lambda$ for $j=1, 2, \ldots, N$. This means that $(c_{1,j}\alpha_j, c_{2,j}\alpha_j, \ldots, c_{M,j}\alpha_j)$ is an estimate at hand for $j=1, 2, \ldots, N$. For the nonzero rows, this estimate is fed to a standard decoder in the base station 170 for the code book assigned to UE j to decode the transmitted signals.

To construct the UE signatures, any matrix suitable for compressed sensing (such as Random Gaussian matrices) can be applied as a signature sequence.

Figure 4:
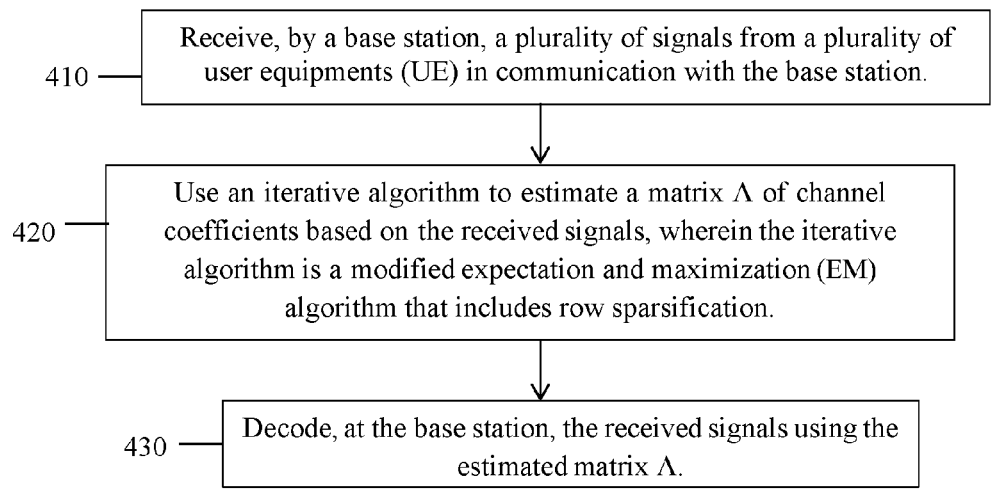
FIG. 4 illustrates a flowchart of an embodiment method for decoding received signals.

FIG. 4 illustrates a flowchart of an embodiment method 400 for decoding received signals. As shown, the method 400 begins at step 410, where a base station receives a plurality of signals from a plurality of user equipments (UE) in communication with the base station. Thereafter, the method 400 proceeds to step 420, where the base station uses an iterative algorithm to estimate a matrix $\Lambda$ of channel coefficients based on the received signals. The iterative algorithm may be a modified expectation and maximization (EM) algorithm that includes row sparsification. Subsequently, the method 400 proceeds to step 430, where the base station decodes the received signals using the estimated matrix $\Lambda$.

Figure 5:
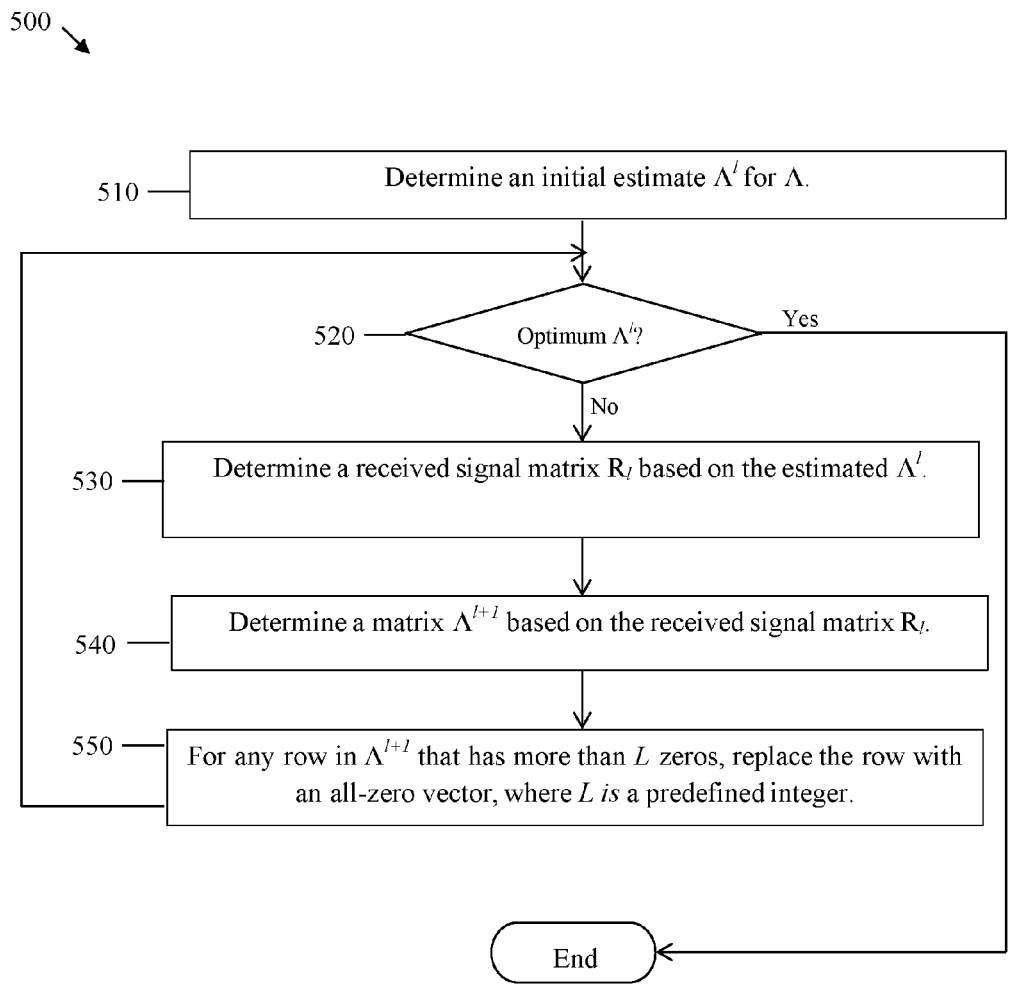
FIG. 5 illustrates a flowchart of an embodiment method for using an iterative algorithm to estimate a matrix of channel coefficients.

FIG. 5 illustrates a flowchart of an embodiment method 500 for using an iterative algorithm to estimate a matrix of channel coefficients, as may be performed by a base station. As shown, the method 500 begins at step 510, where the base station determines an initial estimate $\Lambda^1$ for a channel coefficient matrix $\Lambda$, for example based on a plurality of signals received from a plurality of user equipments (UE). Thereafter, the method 500 proceeds to step 520, where for each iteration l (starting from 1), it is determined whether or not $\Lambda^l$ is an optimum value. When $\Lambda^l$ is determined to be optimum, the method 500 ends. On the other hand, when $\Lambda^l$ is determined not to be optimum, the method 500 proceeds to step 530, where the base station determines a received signal matrix $R_l$ based on the estimated $\Lambda^l$. At step 540, the base station determines a matrix $\Lambda^{l+1}$ based on the received signal matrix $R_l$. At step 550, for any row in $\Lambda^{l+1}$ that has more than L zeros, the base station replaces the row with an all-zero vector, where L is a predefined integer. The method 500 further proceeds to step 520 after step 550.

Simulation Results

In FIG. 3, simulation results of communications using the disclosed embodiments are shown. As can be seen, the transmission scheme according to this disclosure performs as well as the no multiple access interference case, but is six times more bandwidth efficient.

The performance of this disclosure shown in FIG. 3 is simulated for 60 UEs 110 on a dedicated channel. At any given time, four UEs are active, but it is not known at the base station 170 which four UEs 110 these are. Each UE 110 is assigned a randomized signature of length 10 created according to an i.i.d. Gaussian distribution and normalized to have length one. The transmission uses encoded binary phase shift keying (BPSK) with packets of length 100. The channel is Rayleigh fading. The value SNR in the plot of FIG. 3 is the collected Energy per transmitted bit to noise power spectral density $E_b/N_o$. In the classical case, each UE 110 uses a signature of length 60, and these signatures are assumed to be orthogonal to each other. Thus, there is no multiple access interference. The bandwidth efficiency of this case is ⅙ of the conventional case described above. In both cases, the channels of each UE 110 are assumed to be perfectly estimated at the receiver of base station 170.

In this disclosure, a new method is provided for systems beyond 4G systems. In the disclosed embodiments, the receiver at the base station 170 does not need to know which transmitters of the UEs are active but the receiver knows an upper bound on the number of transmitting UEs. The disclosed embodiments use a spreading technique using short signatures and a modified Expectation Maximization (EM) algorithm to decode the transmitting UEs at the base station 170. Simulation results provided demonstrate the performance of the scheme of this disclosure.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for use in a wireless communication network, the method comprising:
receiving, by a base station, a plurality of signals from a plurality of user equipments (UE) in communication with the base station;
using an iterative algorithm to estimate a matrix $\Lambda$ of channel coefficients based on the received signals, wherein the iterative algorithm is a modified expectation and maximization (EM) algorithm that includes row sparsification; and
decoding, at the base station, the received signals using the estimated matrix $\Lambda$.

2. The method of claim 1, wherein using the iterative algorithm to estimate the matrix of channel coefficients based on the received signals comprises:
determining an initial estimate $\Lambda^1$ for $\Lambda$; and
for each iteration l of the iterative algorithm, starting from l=1: determining a received signal matrix $R_l$ based on the estimated $\Lambda^l$, determining a matrix $\Lambda^{l+1}$ based on the received signal matrix $R_l$, and for any row in $\Lambda^{l+1}$ that has more than L zeros, replace the row with an all-zero vector, where L is a predefined integer.

3. The method of claim 1, wherein the base station receives signals transmitted from the plurality of UEs without coordination between the UEs.

4. The method of claim 1, wherein the base station does not know which UEs are active but knows an upper bound of the number of UEs that are transmitting signals.

5. A base station configured to operate in a wireless network, the base station comprising:
a processor; and
a non-transitory computer readable storage medium storing programming for execution by the processor, the programming including instructions to:
receive a plurality of signals from a plurality of user equipments (UEs) in communication with the base station;
use an iterative algorithm to estimate a matrix $\Lambda$ of channel coefficients based on the received signals, wherein the iterative algorithm is a modified expectation and maximization (EM) algorithm that includes row sparsification; and
decode the received signals using the estimated matrix $\Lambda$.

6. The base station of claim 5, wherein the instructions to use the iterative algorithm include instructions to:
determine an initial estimate $\Lambda^1$ for $\Lambda$; and
for each iteration l of the iterative algorithm, starting from l=1: determine a received signal matrix $R_l$ based on the estimated $\Lambda^l$, determine a matrix $\Lambda^{l+1}$ based on the received signal matrix $R_l$, and for any row in $\Lambda^{l+1}$ that has more than L zeros, replace the row with an all-zero vector, where L is a predefined integer.

7. The base station of claim 5, wherein the base station is configured to receive signals transmitted from the plurality of UEs without coordination between the UEs.

8. The base station of claim 5, wherein the base station does not know which UEs are active but knows an upper bound of the number of UEs that are transmitting signals.

9. A wireless network system, comprising:
a plurality of user equipments (UEs); and
a base station configured to communicate with the plurality of UEs, the base station configured to receive a plurality of signals from the plurality of UEs, to use an iterative algorithm to estimate a matrix $\Lambda$ of channel coefficients based on the received signals, wherein the iterative algorithm is a modified expectation and maximization (EM) algorithm that includes row sparsification; and to decode the received signals using the estimated matrix $\Lambda$.

10. The system of claim 9, wherein in using the iterative algorithm, the base station is configured to:
determine an initial estimate $\Lambda^1$ for $\Lambda$; and
for each iteration l of the iterative algorithm, starting from l=1: determine a received signal matrix $R_l$ based on the estimated $\Lambda^l$, determine a matrix $\Lambda^{l+1}$ based on the received signal matrix $R_l$, and for any row in $\Lambda^{l+1}$ that has more than L zeros, replace the row with an all-zero vector, where L is a predefined integer.

11. The system of claim 9, wherein the base station is further configured to receive signals transmitted from the plurality of UEs without coordination between the UEs.

12. The system of claim 9, wherein the base station does not know which UEs are active but knows an upper bound of the number of UEs that are transmitting signals.

13. The method of claim 2, wherein the initial estimate $\Lambda^1$ is determined under the assumption that columns of signature sequences of the UEs are normalized to all have the same length.

14. The method of claim 13, wherein signature sequences of the UEs are constructed using a matrix for compressed sensing.

15. The base station of claim 6, wherein the initial estimate $\Lambda^1$ is determined under the assumption that columns of signature sequences of the UEs are normalized to all have the same length.

16. The base station of claim 15, wherein signature sequences of the UEs are constructed using a matrix for compressed sensing.

17. The system of claim 10, wherein the initial estimate $\Lambda^1$ is determined under the assumption that columns of signature sequences of the UEs are normalized to all have the same length.

18. The system of claim 17, wherein signature sequences of the UEs are constructed using a matrix for compressed sensing.

* * * * *